United States Patent
Wang et al.

(10) Patent No.: US 10,193,476 B1
(45) Date of Patent: Jan. 29, 2019

(54) SYSTEMS AND METHODS FOR OPERATING A BRUSHLESS DC MOTOR

(71) Applicant: Marvell International Ltd., Hamilton (BM)

(72) Inventors: Yichao Wang, Singapore (SG); Foo Leng Leong, Singapore (SG); Edy Susanto, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/386,491

(22) Filed: Dec. 21, 2016

Related U.S. Application Data (60) Provisional application No. 62/270,339, filed on Dec. 21, 2015.

(51) Int. Cl.
*H02P 6/28* (2016.01)

(52) U.S. Cl.
CPC ..................... *H02P 6/28* (2016.02)

(58) Field of Classification Search
CPC ........................................................ H02P 6/28
USPC ........................................................ 318/400
See application file for complete search history.

(56) References Cited

U.S. PATENT DOCUMENTS 9,742,319 B2 * 8/2017 Marvelly ................. H02P 6/085
2005/0110442 A1 * 5/2005 Trifilo ....................... H02P 6/10
　　　　　　　　　　　　　　　　　　　　　　　　318/400.23
2010/0131083 A1 * 5/2010 Leany ................. H02P 23/0027
　　　　　　　　　　　　　　　　　　　　　　　　700/83

OTHER PUBLICATIONS

Radio-Electronics.com, Resources and Analysis for Electronic Engineers; "Double Balanced Mixer Tutorial"; http://www.radio-electronics.com/info/rf-technology-design/mixers/double-balanced-mixer-tutorial.php; downloaded Dec. 21, 2016; 7 pages.
Steven Keeping; "An Introduction to Brushless DC Motor Control"; Digi-Key Electronics; http://www.digikey.com/en/articles/techzone/2013/marlan-introduction-to-brushless-dc-motor-control; Mar. 27, 2013; 6 pages.

* cited by examiner

*Primary Examiner* — Kawing Chan
*Assistant Examiner* — Devon Joseph (57) ABSTRACT

A system for controlling operation of a brushless DC motor is provided. The system includes a memory, driving profile and motor controllers, and an inverter. The memory stores: a scaling factor indicative of how much to increase an operating parameter of a base driving profile; and the base driving profile indicative of speed over time of a drive cycle of the brushless DC motor. The driving profile controller generates a motor driving profile, indicating an operating parameter for driving the brushless DC motor, where the operating parameter is based on (i) the scaling factor, and (ii) the base driving profile. The controller generates a control signal based on the operating parameter of the motor driving profile. The inverter: receives a direct current from a DC source; responsively to the control signal, converts the direct current to an alternating current; and drives the brushless DC motor via the alternating current.

25 Claims, 8 Drawing Sheets

SYSTEMS AND METHODS FOR OPERATING A BRUSHLESS DC MOTOR

CROSS-REFERENCE TO RELATED APPLICATIONS

This application claims the benefit of U.S. Provisional Application No. 62/270,339, filed on Dec. 21, 2015. The entire disclosure of the application referenced above is incorporated herein by reference.

FIELD

The present disclosure relates to control of brushless DC motors and more specifically to using operational profiles for controlling brushless DC motors.

BACKGROUND

A brushless direct current (DC) motor control system typically includes a DC source that supplies power to an inverter. The inverter converts the DC power to alternating current (AC) power having corresponding bi-directional current waveforms that are provided respectively to coils of a brushless DC motor. The inverter includes switches that are controlled by a controller. The controller generates pulse width modulation (PWM) control signals, which are provided to each of the switches. The controller adjusts duty cycles of the PWM signals to adjust the speed of the motor.

Figure 5:
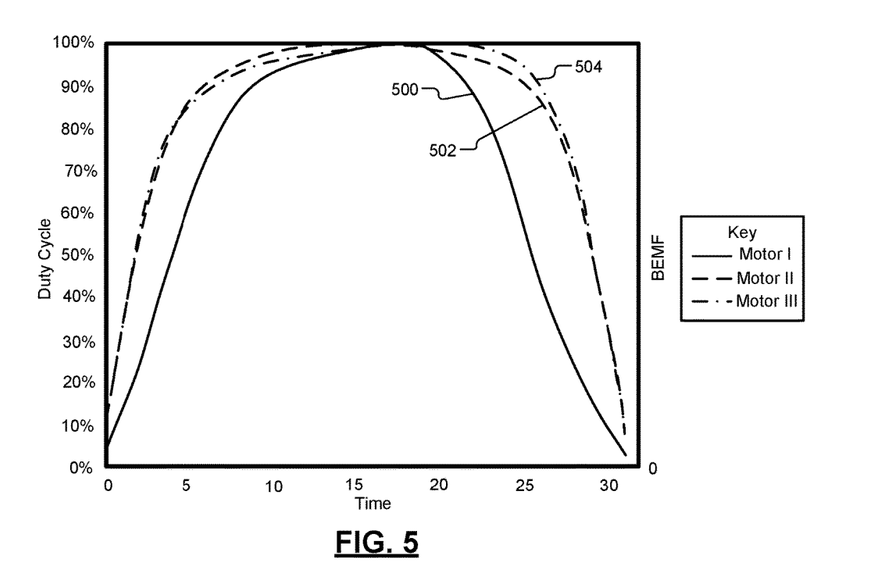
FIG. 5 is an example plot of BEMF profiles of multiple brushless DC motors.

Sensors, such as Hall effect sensors, are suitably used to determine the position and speed of the brushless DC motor. The controller, for example, typically generates the PWM signals based on the determined speed and/or a predetermined back electromotive force (BEMF) profile of the brushless DC motor. BEMF of a brushless DC motor refers to an amount of resistance to rotation of a rotor of the motor relative to the speed of the motor. As speed of the motor increases, resistance to the rotation of the rotor increases. A BEMF profile is a plot relating BEMF of a motor to speed of the motor. As the speed of a motor (or a duty cycle of the PWM signals of the motor) increases, the amount of BEMF increases. Examples of BEMF profiles of different motors are shown in FIG. 5.

To maximize operating efficiency of a brushless DC motor (hereinafter referred to as a "motor"), a driving profile of the motor is generated to match a BEMF profile of the motor. The driving profile refers to duty cycles of one or more control signals provided to switches of an inverter, which is used to drive the motor. Different types of motors have different BEMF profiles. In addition, different motors of the same type have different BEMF profiles due to, for example, differences associated with manufacturing tolerances and/or differences in manufacturing at different facilities.

A large amount of storage is needed to store the BEMFs for the different motors. For this reason and to minimize the amount of storage needed, a manufacturer selects a single predetermined BEMF profile and applies that same BEMF profile to different motors. Control systems manufactured by the manufacturer of the different motors store the single predetermined BEMF profile. The single predetermined BEMF profile typically does not match the BEMFs of the motors, but rather is a BEMF profile used to approximate the BEMFs of the motors. Since each motor is driven based on a BEMF profile that does not match an actual BEMF of that motor, driving efficiency is not maximized. Driving efficiency of a motor refers to an amount of power out of the motor relative to an amount of power in to the motor.

SUMMARY

A system for controlling operation of an operating brushless direct current motor is provided. The system includes a memory, a driving profile controller, a motor controller and an inverter. The memory is configured to store (i) a scaling factor indicative of how much to increase an operating parameter of a base driving profile, and (ii) the base driving profile indicative of speed over time of a drive cycle of the operating brushless direct current motor. The drive cycle refers to transitioning the operating brushless direct current motor from a minimum operating speed to a maximum operating speed and then back to the minimum operating speed. The driving profile controller is configured to generate a motor driving profile, indicating an operating parameter for driving the operating brushless direct current motor, wherein the operating parameter in the motor driving profile is based on (i) the scaling factor, and (ii) the base driving profile. The controller is configured to generate a first control signal based on the operating parameter of the motor driving profile. The inverter is configured to (i) receive a direct current from a direct current source, (ii) responsively to the first control signal, convert the direct current to an alternating current, and (iii) drive the operating brushless direct current motor via the alternating current.

In other features, a method for controlling operation of an operating brushless direct current motor is provided. The method includes storing, in a memory, (i) a scaling factor indicative of how much to increase an operating parameter of a base driving profile, and (ii) the base driving profile indicative of speed over time of a drive cycle of the operating brushless direct current motor. The drive cycle refers to transitioning the operating brushless direct current motor from a minimum operating speed to a maximum operating speed and then back to the minimum operating speed. The method further includes: generating a motor driving profile, indicating an operating parameter for driving the operating brushless direct current motor, the motor driving profile being based on (i) the scaling factor, and (ii) the base driving profile; generating a first control signal based on the operating parameter of the motor driving profile; receiving a direct current from direct current source at an inverter; based on the first control signal, converting the direct current to an alternating current; and driving the operating brushless direct current motor via the alternating current.

In other features, a system is provided for determining parameters for converting a base driving profile of an operating brushless direct current motor to a motor driving profile. The system includes a motor controller, a back electromotive force controller, and a scaling factor controller. The motor controller is configured to transition the operating brushless direct current motor through a drive cycle of the operating brushless direct current motor, wherein the drive cycle refers to transitioning the operating brushless direct current motor from a minimum operating speed to a maximum operating speed and then back to the minimum operating speed. The back electromotive force controller is configured to (i) while the brushless direct current motor is being transitioned through the drive cycle, monitor at least one sensor signal received from a sensor of the operating brushless direct current motor, and (ii) based on the sensor signal, determine a back electromotive force profile of the operating brushless direct current motor. The sensor signal is indicative of a back electromotive force on the operating brushless direct current motor. The back electromotive force profile is indicative of back electromotive forces for the drive cycle. The scaling factor controller is configured to determine a scaling factor, indicative of how much to increase an operating parameter of the base driving profile, based on (i) the base driving profile, and (ii) the back electromotive force profile. The scaling factor controller selects the scaling factor, such that a conversion of the base driving profile based on the scaling factor provides a motor driving profile having values for the operating parameter more closely matching corresponding values of the back electromotive profile than corresponding values of the base driving profile. The motor controller is configured to, subsequent to transitioning the brushless direct current motor through the drive cycle, (i) store the scaling factor, and (ii) provide the scaling factor to a controller of the operating brushless direct current motor to allow the controller of the operating brushless direct current motor to modify the base driving profile to provide the motor driving profile.

In other features, a method for determining parameters for converting a base driving profile of an operating brushless direct current motor to a motor driving profile is provided. The method includes: transitioning the operating brushless direct current motor through a drive cycle of the operating brushless direct current motor, where the drive cycle refers to transitioning the operating brushless direct current motor from a minimum operating speed to a maximum operating speed and then back to a minimum operating speed; and while the operating brushless direct current motor is being transitioned through the drive cycle, monitoring at least one sensor signal received from a sensor of the operating brushless direct current motor. The method further includes: based on the sensor signal, determining a back electromotive force profile of the operating brushless direct current motor, where the sensor signal is indicative of a back electromotive force on the operating brushless direct current motor, and where the back electromotive force profile is indicative of back electromotive forces for the drive cycle; and determining a scaling factor, indicative of how much to increase an operating parameter of the base driving profile, based on (i) a base driving profile, and (ii) the back electromotive force profile, where the scaling factor is selected, such that a conversion of the base driving profile based on the scaling factor provides a motor driving profile having values for the operating parameter more closely matching corresponding values of the back electromotive profile than corresponding values of the base driving profile. The method further includes: storing the scaling factor; and providing the scaling factor to a controller of the brushless direct current motor to allow the controller of the operating brushless direct current motor to modify the base driving profile to provide the motor driving profile.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers are reused to identify similar and/or identical elements.

DESCRIPTION

The examples set forth below include a manufacturing system for determining an appropriate scaling factor for generation of a motor driving profile of a motor. The scaling factor is determined, such that the motor driving profile when generated matches a BEMF profile of the motor. As an example, the scaling factor is selected and/or tuned to maximize driving efficiency of the motor and/or to match the motor driving profile of the motor to the BEMF profile of the motor. The scaling factor and a base driving profile are then used by a motor control system during operation of the motor to generate the motor driving profile. In one embodiment, the scaling factor is used to scale determined quantities and convert the base driving profile to the motor driving profile. The scaling factor is indicative of how much to increase duty cycles of the base driving profile to provide the motor driving profile. The base driving profile is modified based on the scaling factor to generate the driving profile. The motor control system drives the motor based on the generated motor driving profile. This minimizes memory requirements and maximizes driving efficiency of the motor. Memory requirements are minimized because the motor control system stores the scaling factor and the base driving profile and does not need to store multiple BEMF profiles.

Driving efficiency is maximized because the generated driving profile matches the BEMF profile of the motor and the motor is driven based on the generated motor driving profile.

Figure 1:
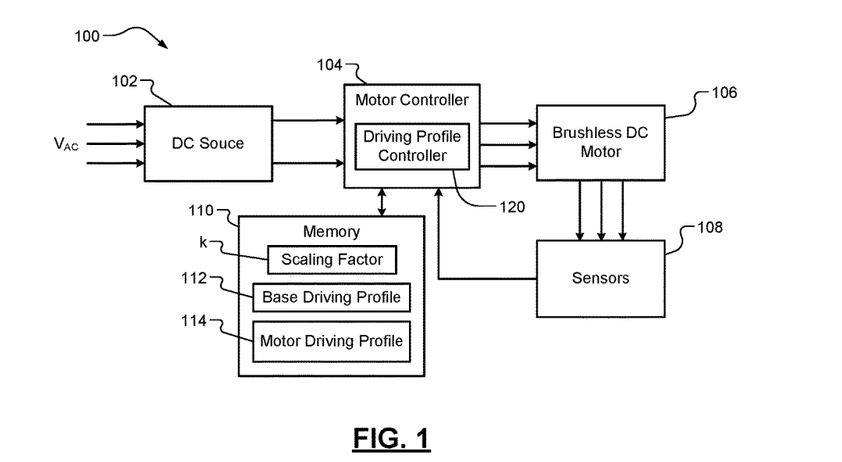
FIG. 1 is an example of a motor control system incorporating a driving profile controller and a brushless DC motor in accordance with an embodiment of the present disclosure.

FIG. 1 shows a motor control system 100 that includes a DC source 102, a motor controller 104, a brushless DC motor 106, sensors 108, and a memory 110. The memory stores a scaling factor (or constant value) k, a base driving profile 112, and a motor driving profile 114. The motor controller 104 includes a driving profile controller 120. In an example, the DC source 102 receives and/or converts AC power to DC power and supplies the DC power to the motor controller 104. Although the DC source 102 is shown as being separate from the motor controller 104, in one embodiment, the motor controller 104 includes the DC source 102. Although 3-phase AC power is shown as being received, in an embodiment, the DC source 102 receives single phase AC power. In other examples, one or more phases of AC power are received and converted via the DC source 102. In an alternative embodiment, the DC source 102 does not receive AC power. In another embodiment, the DC source 102 includes one or more batteries that supply DC power, which is provided to the motor controller 104.

The driving profile controller 120 generates the motor driving profile 114 based on a scaling factor and a base driving profile, as further described below. The motor controller 104 drives the motor 106 based on the generated motor driving profile 114 and signals from the sensors 108. As an example, the sensors 108 include Hall effect sensors for determining position, speed and/or BEMF of the motor 106.

Figure 2:
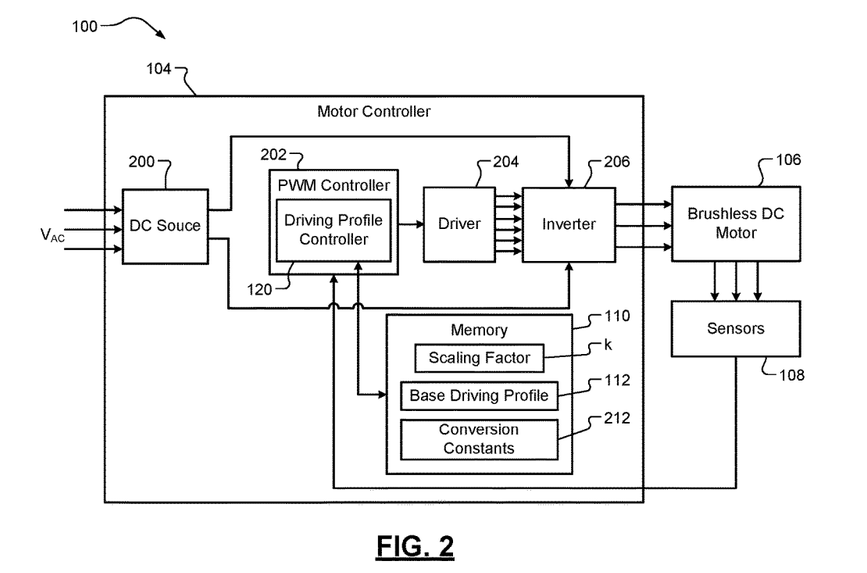
FIG. 2 is the motor control system of FIG. 1 illustrating an example of a motor controller in accordance with an embodiment of the present disclosure.

FIG. 2 shows the motor control system 100 including an example of the motor controller 104. In accordance with an embodiment, the motor control system 100 includes the motor controller 104, the motor 106 and the sensors 108. The motor controller 104 includes a DC source 200, a PWM controller 202, a driver 204, an inverter 206, and the memory 110. The motor 106 is capable of being driven using different techniques. FIG. 2 shows one example in which the PWM controller 202, the driver 204, and the inverter 206 are used. In an example, the PWM controller 202 includes the driving profile controller 120 and, although shown otherwise, includes the driver 204 and/or the inverter 206. The driver 204 and/or the inverter 206 are not included and the PWM controller 202 performs the operations of the driver 204 and/or the inverter 206, in an embodiment.

In an example, the DC source 200 receives and/or converts AC power to DC power and supplies the DC power to the PWM controller 202. In an example, the AC power is 3-phase AC power, as shown or single phase AC power. In other examples, one or more phases of AC power are received and converted. In an alternative embodiment, the DC source 200 does not receive AC power. In another embodiment, the DC source 200 includes one or more batteries that supply DC power, which is provided to the motor inverter.

Figure 6:
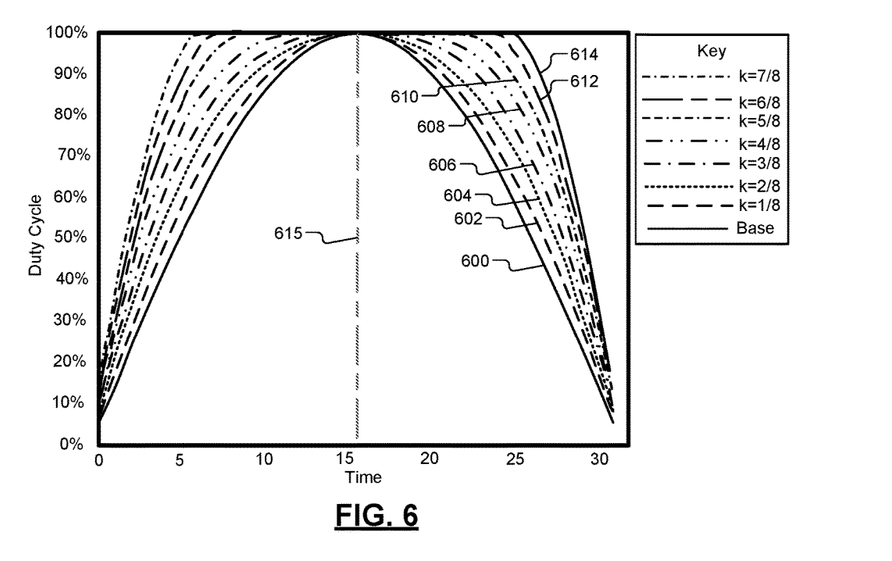
FIG. 6 is an example plot of a base driving profile and multiple scaling-factor-based motor driving profiles accessed by the driving profile controller of FIG. 1 in accordance with an embodiment of the present disclosure.

The PWM controller 202 generates a drive control signal to control the driver 204. The drive control signal is generated based on the motor driving profile generated by the driving profile controller 120. The driving profile controller 120 generates the motor driving profile based on the stored scaling factor k and the base driving profile 112. Examples of the scaling factor k and the base driving profile are shown in FIG. 6. The PWM controller 202 generates the drive control signal based on the signals from the sensors 108. The PWM controller 202 adjusts speed of the motor 106 based on the signals from the sensors 108.

The memory 110 also stores conversion constants 212 (e.g., A, B, C), which in some embodiments are used by the driving profile controller 120 in generating the motor driving profile 114. In an embodiment, the scaling factor k and the conversion constants 212 are predetermined during manufacturing of the motor controller 104 and stored in the memory 110. The conversion constants 212 are not the same as the scaling factor. The conversion constants are used to determine quantities that are mathematically combined and the corresponding result is scaled by the scaling factor. The conversion constants are used to adjust duty cycles of corresponding portions of the motor driving profile. The scaled quantity is summed with the base driving profile 112 to provide the motor driving profile 114. See, for example, below equations 1 and 2. Determination of the scaling factor k and the conversion constants 212 are described with respect to FIGS. 4 and 12 below. Use of the scaling factor k and the conversion constants 212 to generate the motor driving profile 114 is further described below with respect to FIG. 11.

Figure 3:
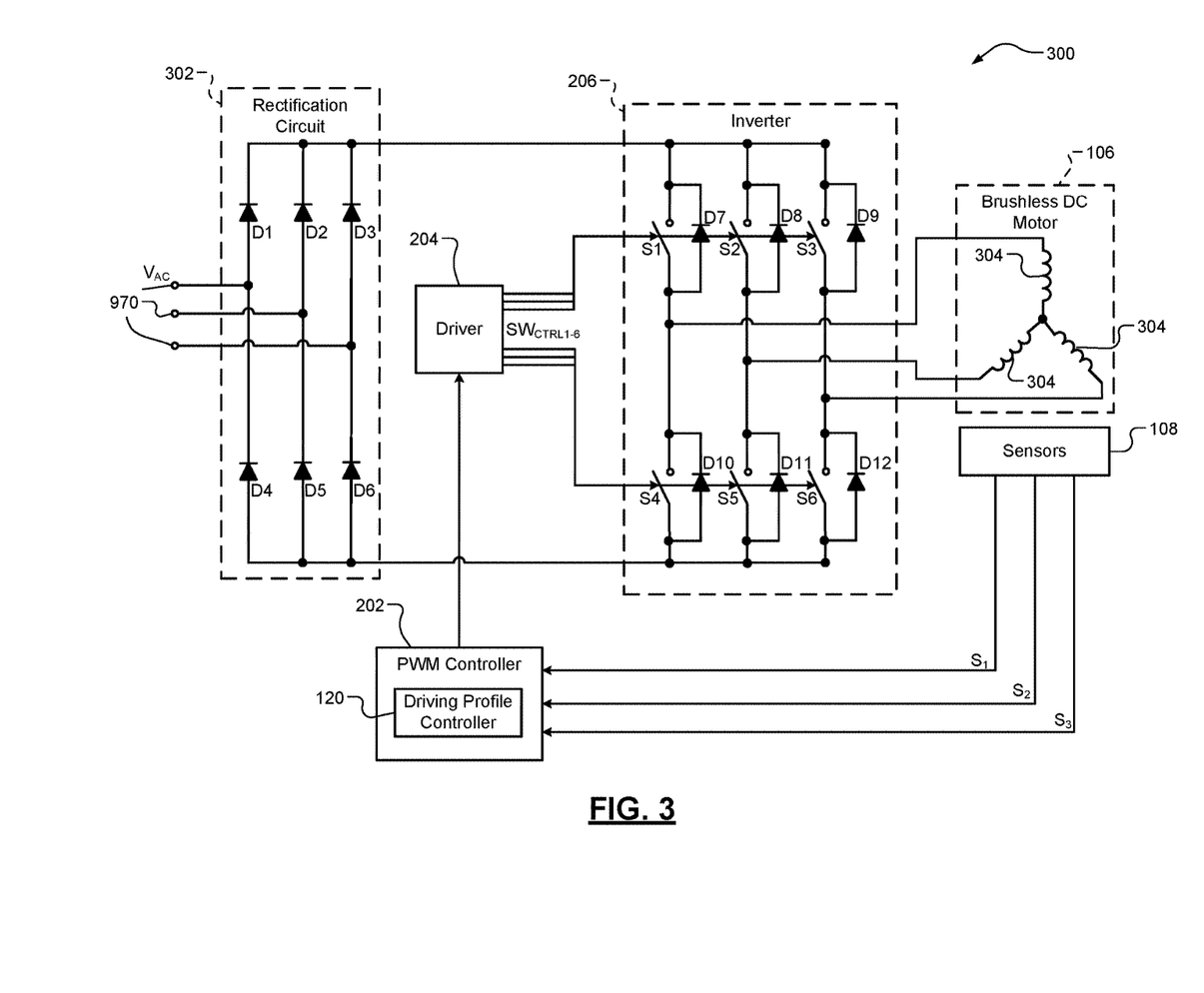
FIG. 3 is an example of a drive circuit incorporating the driving profile controller of FIG. 1.

The driver 204 (i) receives the DC power from the DC source 200, and (ii) based on the profile control signal, generates switch control signals to control switches of the driver 204. Examples of the switches are shown in FIG. 3. The driver 204 generates pulse width modulated (PWM) signals that are used to provide a predetermined average voltage and an average current to the coils. The inverter 206, based on the switch control (or PWM) signals, converts the output of the DC source 200 to drive signals to drive the coils of the motor 106. The drive signals are AC output signals. In one embodiment, the driver 204 is not included in the motor controller 104 and the PWM controller 202 generates control signals that are provided from the PWM controller 202 to control states of the switches in the inverter 206.

FIG. 3 shows a drive circuit 300 that includes a rectification circuit 302, the driver 204, the inverter 206, the motor 106, the sensors 108, and the PWM controller 202, in accordance with an embodiment. In an embodiment, the drive circuit 300 is included in the motor control system 100 of FIGS. 1-2. The rectification circuit 302 is an example of a DC source and in one embodiment replaces one of the DC sources 102, 200 of FIGS. 1-2. The rectification circuit 302 receives AC power shown as AC voltage $V_{AC}$ and rectifies the AC voltage $V_{AC}$ to provide a rectified AC voltage (or DC voltage), in one embodiment. The rectification circuit 302 includes diodes D1-D6; one pair of diodes per phase of the AC voltage $V_{AC}$.

The inverter 206 includes switches S1-S6 and diodes D7-D12; one pair of switches and one pair of diodes per phase and coil of the motor 106. Each pair of the switches S1-S6 is connected in series between output terminals of the rectification circuit 302. Each of the diodes D7-D12 is connected across a respective one of the switches S1-S6. In an embodiment, each of the switches S1-S6 is a transistor with a control terminal receiving a respective one of the switch control signals $SW_{CTRL1-6}$. The inverter 206 converts the output of the rectification circuit 302 to AC output signals, which are provided to respective coils 304 of the motor 106 to drive the motor 106.

The PWM controller 202 generates the drive control signal to control generation and/or duty cycles of the switch control signals. The drive control signal is generated based on the driving profile generated by the driving profile controller 120. In an embodiment, the sensors 108 generate the sensor signals $S_1$-$S_3$ from which generation of the drive control signal is based.

Operation of the motor control system 100 and the drive circuit 300 is further described below with respect to FIG. 11.

Figure 4:
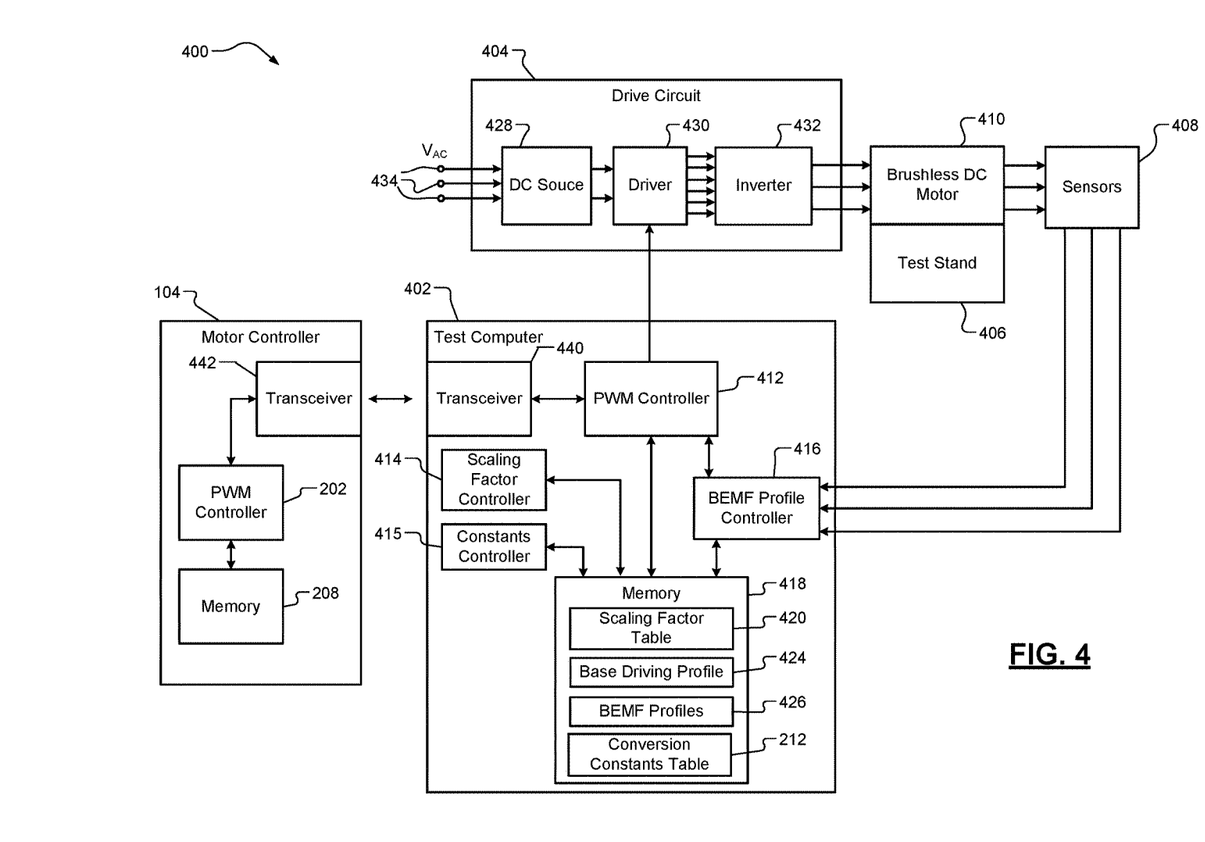
FIG. 4 is an example of a scaling factor determination system in accordance with an embodiment of the present disclosure.

FIG. 4 shows a scaling factor determination system 400 that includes a test computer 402, a drive circuit 404, a test stand 406 and sensors 408, in accordance with an embodiment. A motor 410 (e.g., a brushless DC motor) is mounted on the test stand 406. The test computer 402 controls the drive circuit 404 based on signals from the sensors 408 to determine a BEMF profile of the motor 410. In an embodiment, the motor 410 replaces the motor 106 of FIGS. 1-3.

The test computer 402 includes a PWM controller 412, a scaling factor controller 414, a constants controller 415, a BEMF profile controller 416, and a memory 418. The memory 418 stores a scaling factor table 420, a base driving profile 422, BEMF profiles 424, and conversion constants table 426. The scaling factor table 420 includes scaling factors determined for motors. An example of the base driving profile is shown in FIG. 6. Examples of BEMF profiles are also shown in FIG. 5.

The scaling factor controller 414 determines scaling factors for respective motors; one scaling factor per motor. The scaling factors are determined based on BEMF profiles of the motors. Similarly, the constants controller 415 determines sets of conversion constants for respective motors; one set of conversion constants per motor. In this manner, in an embodiment, each motor has a unique scaling factor and set of conversion constants. The scaling factors and conversion constants are determined to match driving profiles with corresponding BEMF profiles of the motors and to maximize operating efficiencies of the motors. The controllers 414 and 415 are sometimes referred to as selection controllers.

The BEMF profile controller 416 determines BEMF profiles of motors. As an example, the motor 410 is operated and BEMFs of the motor are determined based on signals from the sensors 408. In one example, the sensors 408 include Hall effect sensors. The PWM controller 412 varies speed of the motor 410 from a minimum speed at 0% duty cycle to a maximum speed at or within a predetermined range of 100% duty cycle.

The drive circuit 404 includes a DC source 428, a driver 430, and an inverter 432. The DC source 428 receives an AC voltage $V_{AC}$ at input terminals 434. In one example, the DC source 428, driver 430 and inverter 432 operate similarly to the DC source 200, driver 204 and inverter 206 of FIG. 2. The PWM controller 412 generates a drive control signal to control operation of the driver 430 and as a result operation of the inverter 432. The driver 430 generates switch control signals to control operation of the inverter 432.

The test computer 402 includes a transceiver 440 that is connected to the PWM controller 412 and communicates with a transceiver 442 of motor controllers (e.g., the motor controller 104). The transceiver 442 is connected to the PWM controller 202. The scaling factor and/or conversion constants determined by the PWM controller 412 are transmitted to the PWM controller 202 via the transceiver 442 to the transceiver 402 for storage in the memory 110 of the motor controller 104. The transceivers 440, 442 implement wireless or wired communication. The transceivers 440, 442 communicate directly with each other or via a network. In an embodiment, the PWM controller 412 transmits other detected and/or determined parameters, such as BEMFs to the PWM controller 202 via the transceiver 440. In an embodiment, the PWM controller 202 generates the base driving profile 424 based on the detected and/or determined parameters and transmits the base driving profile 424 to the PWM controller 412 via the transceiver 442. In an embodiment, the PWM controller 202 transmits the BEMF profiles 426 to the PWM controller 412 via the transceiver 442.

Operation of the scaling factor determination system 400 is further described below with respect to FIG. 12.

FIG. 5 shows an example plot of BEMF profiles 500, 502, 504 for multiple brushless DC motors (identified as Motor I, Motor II, and Motor III). The BEMF profiles 500, 502, 504 are shown as respective curves of BEMFs (or duty cycles) over time. For each of the BEMF profiles, duty cycle is increased from a minimum duty cycle (e.g., 0%) to a maximum duty cycle (e.g., 100%) and back down to the minimum duty cycle. As duty cycle is increased, the speed of the motor is increased. Similarly, as the duty cycle is decreased, the speed of the motor is decreased. The duty cycle is shown as increasing in FIG. 5 for the portions of the curves with positive slope. The duty cycle is shown as decreasing in FIG. 5 for the portions of the curves with negative slope.

FIG. 6 shows an example plot of a base driving profile 600 and multiple scaling-factor-based motor driving profiles 602, 604, 606, 608, 610, 612, 614. As an example, the base driving profile 600 is shown as a half-sine wave, where an increasing portion of the base driving profile is a mirror image of a decreasing portion of the base driving profile relative to a vertical line 615 passing through an apex of the half-sine wave. In an embodiment, the half-sine wave corresponds to a full drive cycle (or test drive cycle) of a motor from a minimum speed-to-a maximum speed-to a minimum speed. In one example, the base driving profile has a different shape, depending on (i) the application, and (ii) the base driving profile to motor driving profile conversion to be performed. In another embodiment, the increasing portion of a base driving profile is not a mirror image of the decreasing portion. The scaling-factor-based motor driving profiles 602, 604, 606, 608, 610, 612, 614 have respective scaling factor values, which for this example are shown as k being equal to ⅛, ⅖, ⅜, ⅘, ⅝, ⅚, ⅞, respectively. As described above and as further described below, the scaling factor is used to scale determined quantities, which are summed with a base driving profile to provide a motor driving profile. In an embodiment, the scaling factor is a constant value that is multiplied by a determined quantity and is used to scale the determined quantity and duty cycles of the base driving profile.

Figure 7:
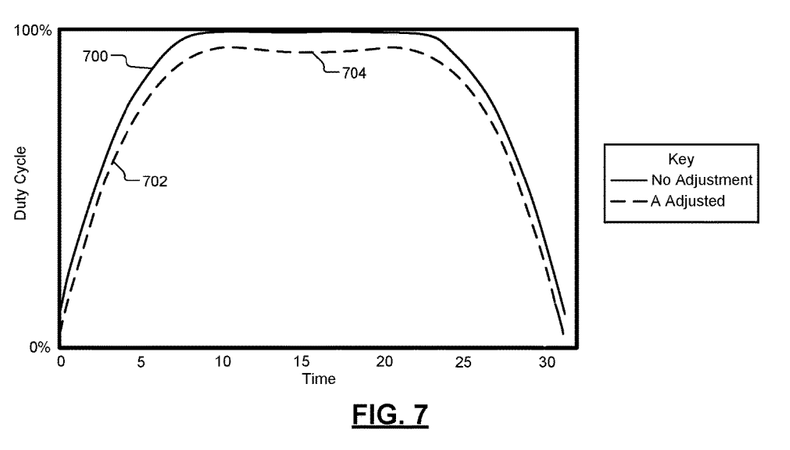
FIG. 7 is an example plot of a non-adjusted driving profile and an adjusted driving profile accessed and generated by the driving profile controller of FIG. 1, where a first conversion constant A is adjusted in accordance with an embodiment of the present disclosure.

FIG. 7 shows an example plot of a non-adjusted (or base) driving profile 700 and an adjusted driving profile 702, where a first conversion constant A is adjusted and conversion constants B and C are unchanged. As shown, adjustment of the first conversion constant A contracts the driving profile 700 by decreasing the corresponding duty cycles of the motor across an operating range of the motor. The adjustment of the first conversion constant A provides a small dip 704 in duty cycle at a center of the driving profile 702, which reduces the speed (or duty cycle) of the motor when in the center of the driving profile 702.

Figure 8:
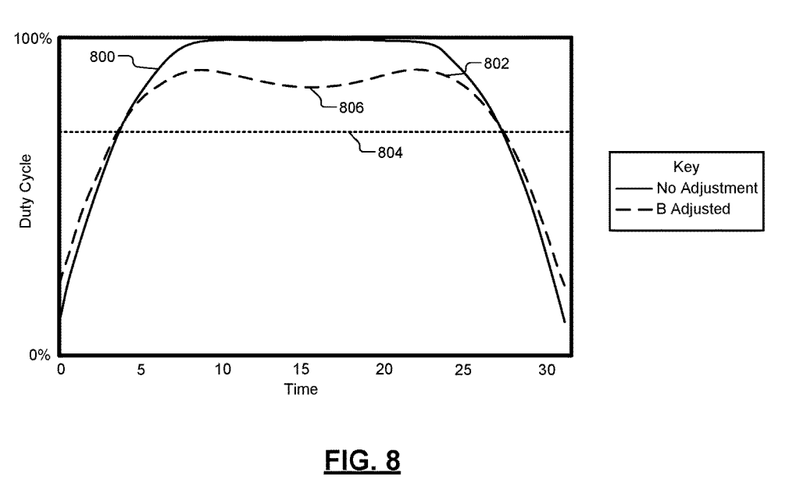
FIG. 8 is an example plot of a non-adjusted driving profile and an adjusted driving profile accessed and generated by the driving profile controller of FIG. 1, where a second conversion constant B is adjusted in accordance with an embodiment of the present disclosure.

FIG. 8 shows an example plot of a non-adjusted driving profile 800 and an adjusted driving profile 802, where the second conversion constant B is adjusted and conversion constants A, C are unchanged. As shown, adjustment of the second conversion constant B increases duty cycles below a predetermined duty cycle 804 and decreases duty cycles above the predetermined duty cycle 804. The adjustment of B also provides a large dip 806 in duty cycle at a center of the driving profile 802, which reduces the speed (or duty cycle) of the motor when in the center of the driving profile 802.

Figure 9:
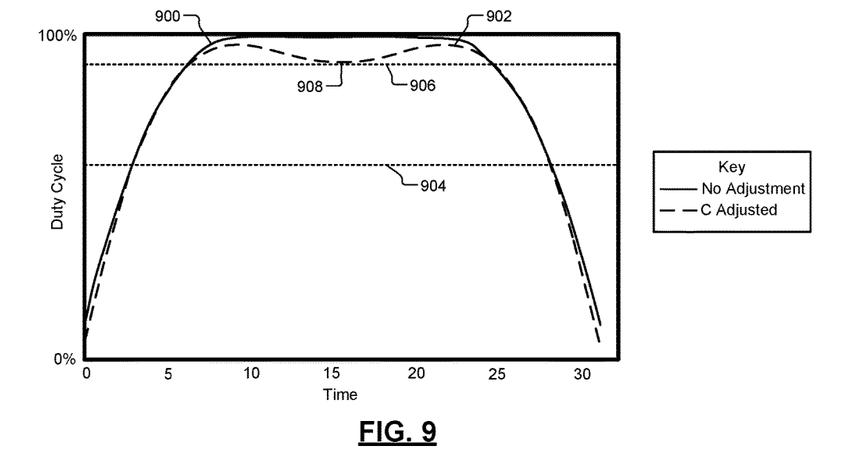
FIG. 9 is an example plot of a non-adjusted driving profile and an adjusted driving profile accessed and generated by the driving profile controller of FIG. 1, where a third conversion constant C is adjusted in accordance with an embodiment of the present disclosure.

FIG. 9 shows an example plot of a non-adjusted driving profile 900 and an adjusted driving profile 902, where the third conversion constant C is adjusted and conversion constants A, B are unchanged. As shown, adjustment of the third conversion constant C decreases duty cycles below a first predetermined duty cycle 904 and increases duty cycles above a second predetermined duty cycle 906. The adjustment of C also provides a moderate dip 908 in duty cycle at a center of the driving profile 902.

Figure 10:
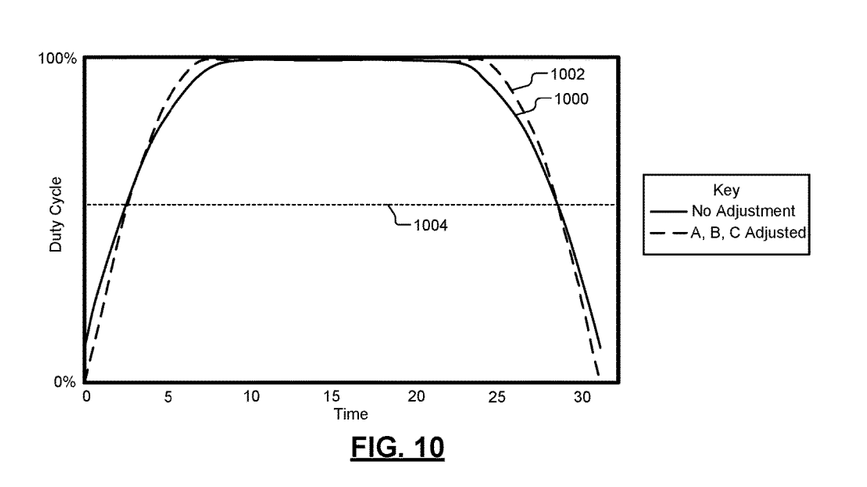
FIG. 10 is an example plot of a non-adjusted driving profile and an adjusted driving profile accessed and generated by the driving profile controller of FIG. 1, where conversion constant A, B, C are adjusted in accordance with an embodiment of the present disclosure.

FIG. 10 shows an example plot of a non-adjusted driving profile 1000 and an adjusted driving profile 1002, where conversion constant A, B, C are adjusted. As shown, adjustment of A, B, and C decreases duty cycles below a predetermined duty cycle 1004, increases duty cycles above the predetermine duty cycle 1004, and provides a minor dip 1006 in duty cycle for a mid-range of the driving profile 1002.

For further defined structure of the controllers of FIGS. 1-4 see below provided methods of FIGS. 11-12 and below provided definition for the term "controller". The systems disclosed herein are configured to be operated using numerous methods, example methods are illustrated in FIGS. 11-12. FIG. 11 shows a method of driving a motor including performing a base driving profile conversion to a motor driving profile. Although the following methods are shown as separate methods, the methods and/or operations from the methods are combinable to be performed as a single method. Also, although the following operations of FIG. 11 are primarily described with respect to the implementations of FIGS. 1-3, the operations are readily modified to apply to other implementations of the present disclosure. In one example, the operations of FIG. 11 are iteratively performed.

Figure 11:
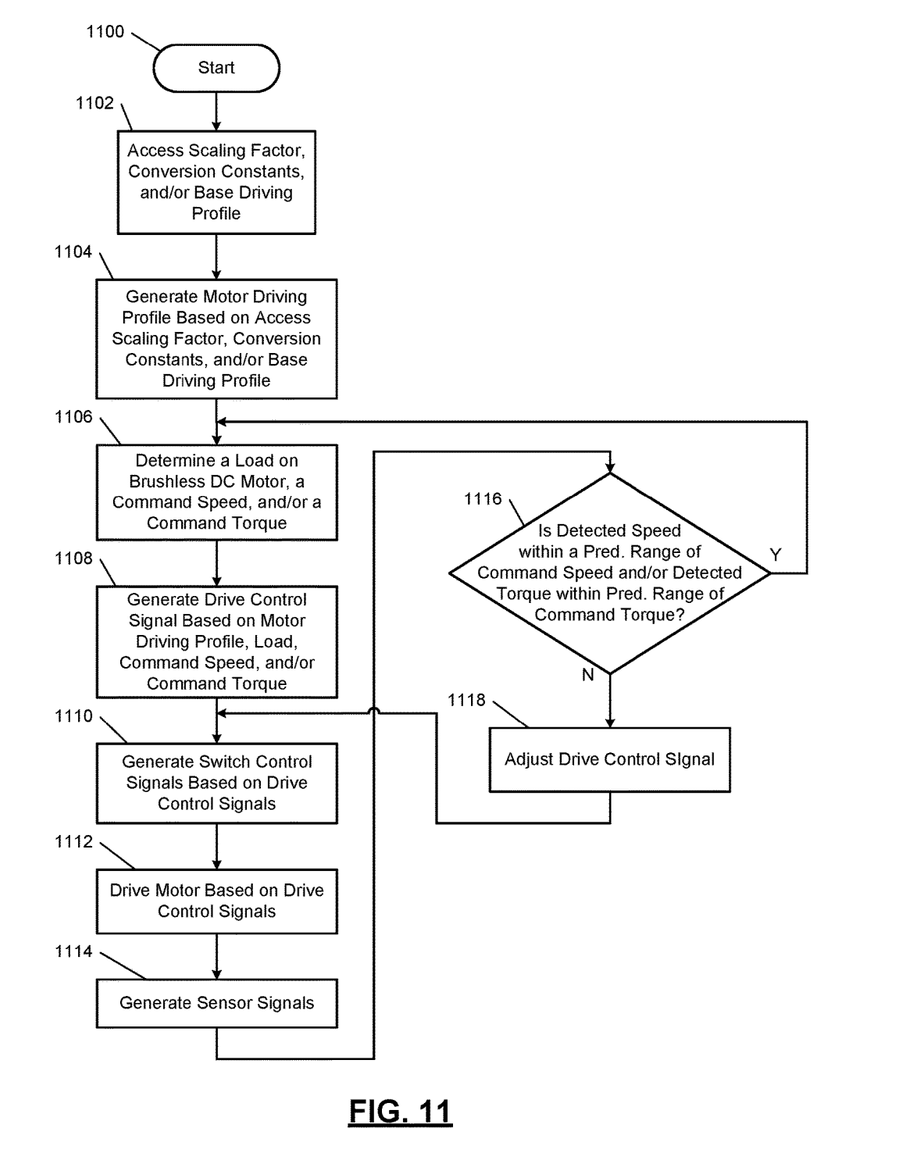
FIG. 11 illustrates a method of driving the brushless DC motor of FIG. 1 including performing a base driving profile conversion in accordance with an embodiment of the present disclosure.

The method of FIG. 11 begins at 1100. At 1102, the driving profile controller 120 accesses a scaling factor k, one or more conversion constants (e.g., A, B, C), and a base driving profile from the memory 110. In one example, the scaling factor k and the conversion constants are integers, real numbers, fractions, etc. The conversion constants A, B, C are customized unique values for the corresponding brushless DC motor. Example results from adjusting the scaling factor k are shown in FIG. 6. Example results from adjusting one or more of the conversion constants A, B, C are shown in FIGS. 5 and 7-10 and below equations 1-2. The values of the scaling factor and the conversion constants are predetermined prior to performing the method of FIG. 11. The scaling factor and conversion constants are fixed values that are used to modify the based driving profile to provide a motor driving profile to match a BEMF profile of the motor. In an embodiment, the scaling factor and the conversion constants are predetermined, such that the motor driving profile matches the BEMF profile of the motor. The term "matches" means that the motor driving profile: is the same as the BEMF profile; has values within a predetermined range of corresponding values of the BEMF profile, and/or when implemented provides a driving efficiency within a predetermined range of a maximum driving efficiency of the motor.

At 1104, the driving profile controller 120 converts the base driving profile to the motor driving profile based on the scaling factor k and the one or more conversion constants. In one example, the base driving profile is represented as $x_{old}$ and the motor driving profile is represented as $x_{new}$, where $x_{old}$ and $x_{new}$ are duty cycle percentages that vary over time. A duty cycle percentage refers to duration of ON time of a full PWM cycle of a switch in an inverter of a motor. In an embodiment, the driving profile controller 120 uses equation 1, equation 2, a modified version of equation 1 or 2, and/or other equation and/or technique to convert the base driving profile $x_{old}$ to the motor driving profile $x_{new}$, where N is a maximum value of x (e.g., 100%). The portions of equations 1 and 2 that are within parentheses are referred to as determined quantities, which are scaled by the scaling factor k $$x_{new} = x_{old} + \left( \frac{N}{2} + \frac{\left(x_{old} - \frac{N}{2}\right)^2}{\frac{N}{2}} \right) \cdot k \quad (1)$$

$$x_{new} = x_{old} + \left( A + \frac{(x_{old} - B)^2}{C} \right) \cdot k \quad (2)$$

By utilizing the scaling factor k, the conversion constants A, B, C and the base driving profile to generate the motor driving profile, a quick conversion of the base driving profile to the motor driving profile is performed in an embodiment. The resultant motor driving profile is used to control operation of the motor 106. This operative control is provided while maximizing driving efficiency of the motor 106. This is because the motor driving profile matches the BEMF profile of the motor 106. In an embodiment, the motor driving profile is calculated during operation of the motor 106 without the motor driving profile and/or other motor driving profiles being stored in the memory 110.

As an alternative embodiment, the motor driving profile is determined using equation 1 and/or 2 or some other technique and stored in the memory 110. As a result, operations 1102 and 1104 are replaced with accessing the predetermined motor driving profile from the memory 110. In one embodiment, the memory 110 stores only the motor driving profile generated prior to or during operation of the motor 106. In another embodiment, multiple motor driving profiles are predetermined for different motors and stored in the memory 110. If the memory 110 stores more than one motor driving profile, then the PWM controller 202 selects one of the motor driving profiles prior to performing operation 1106. In an embodiment, the motor driving profile(s) are trapezoidally shaped as shown in FIGS. 5 and 7-10 or have different shapes.

At 1106, the PWM controller 202 is configured to determine a load on the motor 106, a command speed for the motor 106, and/or a command torque for the motor 106. The command speed and/or command torque is received by the PWM controller 202 as part of a request signal and/or as a user input.

At 1108, the PWM controller 202 generates a drive control signal based on the motor drive profile, the load, the command speed and/or the command torque. In an embodiment, the drive control signal is generated based on equations, tables, a predetermined model of the motor 106, etc. A direct relationship exists between (i) the speed/torque of the motor 106 and (ii) duty cycles of switch control signals and/or PWM of switches of the inverter 206. As the duty cycle and/or PWM percentages increase, the speed/torque of the motor 106 increases.

At 1110, the driver 204 generates switch control signals based on the drive control signal. The switch control signals are pulse width modulated and provided to switches (e.g., the switches S1-S6 of FIG. 3). In an embodiment, each switch control signal has a same duty cycle and as a result each switch is modulated at a same PWM percentage. As an example, if the motor driving profile at a certain time is 70%, then during 70% of a PWM period $V_{DD}$ is received across each coil of the motor 106, where $V_{DD}$ is a HIGH and/or peak voltage out of the inverter 206. During a remainder of the PWM period (i.e. the other 30% of the PWM period) the coils of the motor 106 receive 0V. At 1112, the motor 106 is driven based on output of the inverter 206.

At 1114, the sensors 108 generate sensor signals as described above. At 1116, the PWM controller 202, based on the sensor signals, determines whether a speed of the motor 106 is within a first predetermined range of the command speed and/or whether the torque of the motor 106 is within a second predetermined range of the command torque. If the speed of the motor 106 is within the first predetermined range and/or the torque of the motor 106 is within the second predetermined range, operation 1106 is performed to determine parameters of the motor, otherwise operation 1118 is performed to adjust the drive control signal.

At 1118, the drive control signal is adjusted. In an embodiment, the adjustment of the drive control signal includes generating the drive control signal to increase and/or decrease duty cycles of the switch control signals. Operation 1110 is performed subsequent to operation 1118, in an embodiment.

The above-described operations are meant to be illustrative examples.

Figure 12:
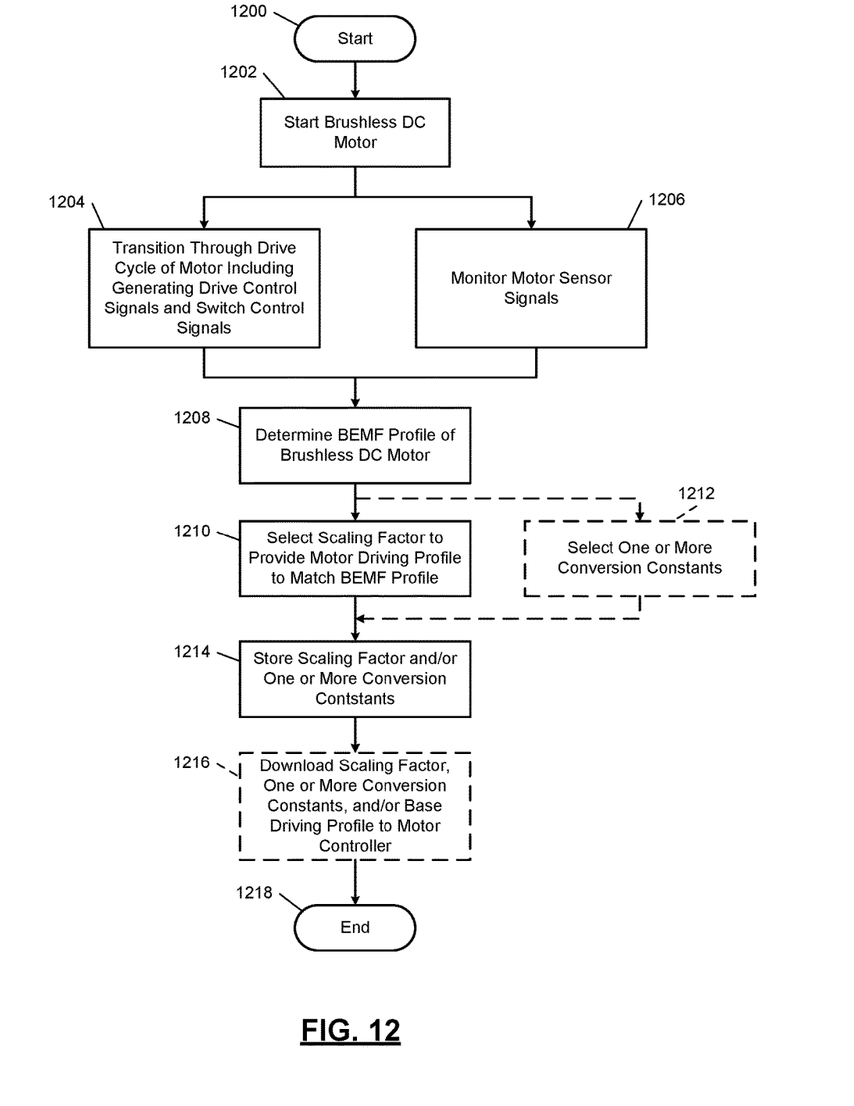
FIG. 12 illustrates a method of determining a scaling factor, conversion constants, and/or a base driving profile via the driving profile controller of FIG. 1 in accordance with an embodiment of the present disclosure.

FIG. 12 shows a method of determining a scaling factor and/or conversion constants, which are referred to as driving profile adjustment parameters. The method includes determining a base driving profile. In an embodiment, the driving profile adjustment parameters and/or the base driving profile is determined during manufacturing of the motor 410 and/or a motor controller (e.g., the motor controller 104) of the motor 410. Although the following operations of FIG. 12 are primarily described with respect to the implementations of FIG. 4, the operations are readily modified to apply to other implementations of the present disclosure. In an embodiment, the operations of FIG. 12 are iteratively performed.

The method of FIG. 12 begins at 1200. At 1202, the brushless DC motor 410 is started. This includes providing power to the brushless DC motor 410, providing power to the drive circuit 404, operating the brushless DC motor at an initial startup speed at or near zero, and/or other initialization operations.

At 1204, the PWM controller 412 controls operation of the driver 430 and the inverter 432 to transition the motor 410 through a full drive cycle of the motor 410. In an embodiment, a full drive cycle of the motor 410 includes: increasing the speed of the motor from the initial speed or a predetermined minimum speed to a predetermined maximum speed; and decreasing speed of the motor from the predetermined maximum speed back down to the predetermined minimum speed. This includes generating a drive control signal and/or switch control signals with corresponding duty cycles to drive the motor through the full drive cycle. In an embodiment, the duty cycles are increased from one or more predetermined PWM percentages to one or more maximum PWM percentages and then decreased from the one or more predetermined maximum percentages to the one or more predetermined minimum percentages. In an embodiment, the duty cycles are adjusted to increase to and decrease from more than one local maximum duty cycle, as shown by the driving profiles of FIGS. 7-9, which include dips in PWM percentages near peak operating speeds and/or peak back electromotive forces of the motors.

At 1206, the BEMF controller 416 monitors sensor signals from the sensors 408. Operation 1206 is performed while operation 1204 is performed. At 1208, the BEMF controller 416 determines a BEMF profile of the motor 410 based on the sensor signals. The BEMF profile includes PWM percentages for an operating range of the motor 410. In an embodiment, the operating range includes a full drive cycle or a partial drive cycle of the motor 410.

At 1210, the scaling factor controller 414 (or a driving profile controller within the PWM controller 412) selects a scaling factor k and stores the scaling factor k in the memory 418. At 1212, the constants controller 415 (or a driving profile controller within the PWM controller 412) selects one or more conversion constants (e.g., A, B, C). The scaling factor k and the conversion constants are tuned to maximize driving efficiency of the motor 410 and/or to match the BEMF profile of the motor 410. In an embodiment, the scaling factor k and the conversion constants are determined using a curve fitting process to match a motor driving profile to the BEMF profile. In an embodiment, the scaling factor k and the conversion constants is adjusted until a best curve fit is provided. As an example, the scaling factor k and the conversion constants are adjusted until a generated motor driving profile best matches the BEMF profile of the motor. In an embodiment, the scaling factor and the conversion constants are adjusted to until an average error between points on the motor driving profile and points on the BEMF profile is minimized. The scaling factor and the conversion constants with associated with the motor driving profile having the minimum average error are then stored at operation 1214. The motor driving profile provided as a result of this method is to be generated by a motor controller (e.g., the motor controller 104) of the motor 410. In an embodiment, the PWM controller 412 is configured to generate the motor driving profile based on a base driving profile and the selected scaling factor and conversion constants.

At 1214, the PWM controller 412 stores the determined scaling factor and conversion constants in the memory 418. In an embodiment, the motor is powered OFF at 1214.

At 1216, the scaling factor, the conversion constants, and/or the base driving profile are downloaded in one embodiment to the motor controller 104 via the transceivers 440, 442. The method ends at 1218.

In one embodiment, the above-described method during operations 1210, 1212, includes the PWM controller 412 selecting the base driving profile. In an embodiment, the memory 418 stores a single base driving profile or multiple base driving profiles. In another embodiment, the base driving profiles have different patterns (i.e. waveform shapes). In yet another embodiment, each base driving profile is for a predetermined type and/or group of motors. In an embodiment, the PWM controller 412 selects the base driving profile based on: the type of the motor 410; the group of the motor 410; driving efficiencies of the motor 410 when operating according to a motor driving profile generated based on (i) the base driving profile, and/or (ii) a curve fitting of the motor driving profile to the BEMF profile of the motor 410.

By selecting the appropriate values of the scaling factor, the conversion constants and/or the base driving profile, a motor driving profile in an embodiment is generated by a motor controller that provide efficient motor operation. This generation eliminates the need for storing the motor driving profile and/or other motor driving profiles in a memory of the corresponding motor controller during manufacturing of the motor controller. As a result, memory requirements of the motor controller are minimized.

In one embodiment, a same set of parameters including a same scaling factor, same conversion constants, and a same base driving profile are provided to motor controllers of motors of a same type and/or group. Motor controllers of motors of different types and/or groups are provided with different scaling factors, conversion constants, and/or base driving profiles. This minimizes the number of scaling factors, conversion constants, and/or base profiles determined. In another embodiment, a scaling factor, conversion constants, and/or a base driving profile determined for a first motor controller are provided to multiple motor controllers of motors of a same type and/or belonging to a same group as a motor of the first motor controller. In another embodiment, each motor controller of a particular motor has a unique set of parameters, such that at least one of a scaling factor, a conversion constant and a base driving profile is different than (i) the corresponding parameter(s) of other motor controllers of motors of a different type and/or group as the particular motor, and (ii) the parameters of other motor controllers of motors the same type and/or group as the particular motor.

The above-described operations are meant to be illustrative examples; in some embodiments, the operations are performed sequentially, synchronously, simultaneously, continuously, during overlapping time periods or in a different order depending upon the application. Also, in some embodiments, one or more of the operations are not performed or skipped depending on the implementation and/or sequence of events.

The above-described method allows for sets of parameters (e.g., k, A, B, C for each motor) to be stored in a memory of a test computer and/or a motor controller for generation of multiple motor driving profiles for respective motors. Each of the sets of parameters is stored in a memory of a respective motor. Examples of values for k are shown in FIG. 6 for respective profiles. As an example, the values of A for the profiles 700, 702 of FIG. 7 are respectively 128, 120. As another example, the values of B for the profiles 800, 802 of FIG. 8 are respectively 100, 128. As yet another example, the values of C for the profiles 900, 902 are respectively 128, 100. As a further example, the values of A-B-C for the profiles 1000, 1002 of FIG. 10 are respectively 150-140-90, 128-128-128. The parameters are applied to a stored function that converts a stored base driving profile to a motor driving profile for operational control of the corresponding motor. This eliminates the need to store: a motor driving profile in a memory of a motor controller of a motor; and/or multiple BEMF profiles and/or motor driving profiles in the memory of a motor, where at least one of the BEMF profiles and/or one of the motor driving profiles is for a different motor. The storing of the sets of parameters as stated allows a single test computer and/or a single motor driving controller to cover a wide range of motors while utilizing a minimal amount of memory. Also, since the generated motor driving profiles match corresponding BEMF profiles, driving efficiencies of the motors are maximized.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

In this application and in some examples, including the definitions below, the term "controller" is interchangeable with the term "circuit." In some examples, the term "controller" refers to, is part of, or includes: an Application Specific Integrated Circuit (ASIC); other suitable hardware components that provide the described functionality; or a combination of some or all of the above, such as in a system-on-chip.

What is claimed is:

1. A system for controlling operation of an operating brushless direct current motor, the system comprising:
   a test computer comprising
      a back electromotive force profile controller configured to receive signals from sensors, and based on the signals, determine a back electromotive force profile of the operating brushless direct current motor, wherein the signals are indicative of one or more parameters of the operating brushless direct current motor, and
      a first driving profile controller;
   a memory configured to store (i) a scaling factor indicative of how much to increase an operating parameter of a base driving profile, and (ii) the base driving profile indicative of speed over time of a drive cycle for a plurality of different brushless direct current motors, wherein the drive cycle refers to transitioning from a minimum operating speed to a maximum operating speed and then back to the minimum operating speed, wherein the plurality of different brushless direct current motors include the operating brushless direct current motor, and wherein the scaling factor is designated for the operating brushless direct current motor,
   wherein the first driving profile controller is configured to generate a motor driving profile designated for the operating brushless direct current motor, wherein the motor driving profile indicates an operating parameter for driving the operating brushless direct current motor, and wherein the operating parameter in the motor driving profile is based on (i) the scaling factor, and (ii) the base driving profile;
   a motor controller configured to generate a first control signal based on the operating parameter of the motor driving profile, wherein the motor controller comprises a second driving profile controller; and
   an inverter configured to (i) receive a direct current from a direct current source, (ii) responsively to the first control signal, convert the direct current to an alternating current, and (iii) drive the operating brushless direct current motor via the alternating current,
   wherein
      the first driving profile controller is configured to transmit, via a first transceiver, the scaling factor and the back electromotive force profile to the second driving profile controller,
      the second driving profile controller is configured to (i) generate the base driving profile, and (ii) transmit the base driving profile or the motor driving profile to the first driving profile controller via a second transceiver,
      the first driving profile controller or the second driving profile controller is configured to, based on the scaling factor, convert the base driving profile to the motor driving profile to match the back electromotive force profile, and
      the first driving profile controller is configured to drive a drive circuit of the operating brushless direct current motor according to the motor driving profile.

2. The system of claim 1, wherein:
   the motor driving profile matches the back electromotive force profile of the operating brushless direct current motor; and the back electromotive force profile is a profile of back electromotive force for (a) a pulse width modulation operating range of the operating brushless direct current motor, or (b) a speed operating range of the operating brushless direct current motor.

3. The system of claim 2, wherein:
the base driving profile does not match the back electromotive force profile, such that at least some duty cycles of the base driving profile are different than corresponding values of the back electromotive force profile; and
the base driving profile has a half-sinusoidal shape.

4. The system of claim 1, wherein the first driving profile controller is configured to:
generate the motor driving profile based on a sum of (i) the base driving profile, and (ii) a product of the scaling factor and a determined quantity indicative of how much to adjust a corresponding portion of the base driving profile; and
generate the determined quantity based on the base driving profile.

5. The system of claim 4, wherein:
the memory is configured to store a plurality of conversion constants; and
the first driving profile controller is configured to generate the determined quantity based on the plurality of conversion constants.

6. The system of claim 1, further comprising a driver, wherein:
the inverter comprises a plurality of switches;
the driver generates a plurality of control signals based on the first control signal, wherein the plurality of switches receive respectively the plurality of control signals; and
the motor controller is configured to, based on the motor driving profile, generate the first control signal to control pulse width modulation of each of the plurality of switches by controlling pulse width modulation of each of the plurality of control signals.

7. A method for controlling operation of an operating brushless direct current motor of a system, wherein the system includes a test computer and a motor controller, wherein the test computer includes a first driving profile controller, and wherein the motor controller includes a second driving profile controller, the method comprising:
receiving signals from sensors, and based on the signals, determining a back electromotive force profile of the operating brushless direct current motor, wherein the signals are indicative of one or more parameters of the operating brushless direct current motor;
storing, in a memory, (i) a scaling factor indicative of how much to increase an operating parameter of a base driving profile, and (ii) the base driving profile indicative of speed over time of a drive cycle for a plurality of different brushless direct current motors, wherein the drive cycle refers to transitioning from a minimum operating speed to a maximum operating speed and then back to the minimum operating speed, wherein the plurality of different brushless direct current motors include the operating brushless direct current motor, and wherein the scaling factor is designated for the operating brushless direct current motor;
transmitting, via a first transceiver of the first driving profile controller, the scaling factor and the back electromotive force profile to the second driving profile controller;
generating the base driving profile at the second driving profile controller;
transmitting the base driving profile or the motor driving profile from the second driving profile controller to the first driving profile controller via a second transceiver;
generating a motor driving profile designated for the operating brushless direct current motor including, based on the scaling factor, converting the base driving profile to the motor driving profile to match the back electromotive force profile, wherein the motor driving profile indicates an operating parameter for driving the operating brushless direct current motor, and wherein the motor driving profile is based on (i) the scaling factor, and (ii) the base driving profile;
driving a drive circuit of the operating brushless direct current motor according to the motor driving profile;
generating a first control signal based on the operating parameter of the motor driving profile;
receiving a direct current from direct current source at an inverter;
based on the first control signal, converting the direct current to an alternating current; and
driving the operating brushless direct current motor via the alternating current.

8. The method of claim 7, wherein:
the motor driving profile matches the back electromotive force profile of the operating brushless direct current motor; and
the back electromotive force profile is a profile of back electromotive force for (a) a pulse width modulation operating range of the operating brushless direct current motor, or (b) a speed operating range of the operating brushless direct current motor.

9. The method of claim 8, further comprising:
the base driving profile does not match the back electromotive force profile; and
the base driving profile has a half-sinusoidal shape.

10. The method of claim 7, further comprising:
generating the motor driving profile based on a sum of (i) the base driving profile, and (ii) a product of the scaling factor and a determined quantity; and
generating the determined quantity based on the base driving profile.

11. The method of claim 10, further comprising:
storing in the memory a plurality of conversion constants; and
generating the determined quantity based on the plurality of conversion constants.

12. The method of claim 7, further comprising:
generating a plurality of control signals based on the first control signal, wherein the inverter comprises a plurality of switches, and wherein the plurality of switches receive respectively the plurality of control signals; and
based on the motor driving profile, generating the first control signal to control pulse width modulation of each of the plurality of control signals and as a result pulse width modulation of each of the plurality of switches.

13. A system for determining parameters for converting a base driving profile for a plurality of different brushless direct current motors to a motor driving profile for an operating brushless direct current motor, wherein the system includes a test computer and a motor controller, wherein the test computer includes a back electromotive force controller, a scaling factor controller, and a first driving profile controller, wherein the motor controller includes a second driving profile controller, and wherein the plurality of different brushless direct current motors include the operating brushless direct current motor, the system comprising:

the motor controller is configured to transition the operating brushless direct current motor through a drive cycle of the operating brushless direct current motor, wherein the drive cycle refers to transitioning from a minimum operating speed to a maximum operating speed and then back to the minimum operating speed;

the back electromotive force controller configured to (i) while the brushless direct current motor is being transitioned through the drive cycle, monitor at least one sensor signal received from a sensor of the operating brushless direct current motor, and (ii) based on the sensor signal, determine a back electromotive force profile of the operating brushless direct current motor, wherein the sensor signal is indicative of a back electromotive force on the operating brushless direct current motor, and wherein the back electromotive force profile is indicative of back electromotive forces for the drive cycle; and the scaling factor controller is configured to determine a scaling factor, indicative of how much to increase an operating parameter of the base driving profile, based on (i) the base driving profile, and (ii) the back electromotive force profile, wherein the scaling factor controller selects the scaling factor, such that a conversion of the base driving profile based on the scaling factor provides a motor driving profile having values for the operating parameter more closely matching corresponding values of the back electromotive force profile than corresponding values of the base driving profile, wherein the scaling factor is designated for the operating brushless direct current motor, wherein the motor driving profile is designated for the operating brushless direct current motor, and wherein the motor controller is configured to, subsequent to transitioning the brushless direct current motor through the drive cycle, (i) store the scaling factor, and (ii) provide the scaling factor to the first driving profile controller of the operating brushless direct current motor, the first driving profile controller is configured to transmit, via a first transceiver, the scaling factor and the back electromotive force profile to the second driving profile controller, the second driving profile controller is configured to (i) generate the base driving profile, and (ii) transmit the base driving profile or the motor driving profile to the first driving profile controller via a second transceiver, the first driving profile controller or the second driving profile controller is configured to, based on the scaling factor, convert the base driving profile to the motor driving profile to match the back electromotive force profile, and the first driving profile controller is configured to drive a drive circuit of the operating brushless direct current motor according to the motor driving profile.

14. The system of claim 13, further comprising a selection controller configured to select one or more conversion constants based on (i) the base driving profile, (ii) the scaling factor, and (iii) the back electromotive force profile, wherein the selection controller is configured to adjust the one or more conversion constants via a curve fitting process, such that a curve of the motor driving profile more closely matches a curve of the back electromotive force profile than a curve of the base driving profile.

15. The system of claim 13, wherein the scaling factor controller is configured to determine a second scaling factor, indicative of how much to increase the operating parameter of the base driving profile, for a second operating brushless direct current motor.

16. The system of claim 13 wherein:

the motor driving profile is provided based on sums of (i) the values of the operating parameter of the base driving profile, and (ii) products of the scaling factor and determined quantities; and the determined quantities are based on (i) the values of the operating parameter of the base driving profile, and (ii) a plurality of conversion constants.

17. A method for determining via a system parameters for converting a base driving profile of an operating brushless direct current motor to a motor driving profile, wherein the system includes a test computer and a motor controller, wherein the test computer includes a first driving profile controller, and wherein the motor controller includes a second driving profile controller, the method comprising:

transitioning the operating brushless direct current motor through a drive cycle of the operating brushless direct current motor, wherein the drive cycle refers to transitioning the operating brushless direct current motor from a minimum operating speed to a maximum operating speed and then back to a minimum operating speed;

while the operating brushless direct current motor is being transitioned through the drive cycle, monitoring at least one sensor signal received from a sensor of the operating brushless direct current motor;

based on the sensor signal, determining a back electromotive force profile of the operating brushless direct current motor, wherein the sensor signal is indicative of a back electromotive force on the operating brushless direct current motor, and wherein the back electromotive force profile is indicative of back electromotive forces for the drive cycle;

determining a scaling factor, indicative of how much to increase an operating parameter of the base driving profile, based on (i) a base driving profile, and (ii) the back electromotive force profile, wherein the base driving profile is for a plurality of brushless direct current motors including the operating brushless direct current motor, wherein the scaling factor is designated for the operating brushless direct current motor, wherein the scaling factor is selected, such that a conversion of the base driving profile based on the scaling factor provides a motor driving profile having values for the operating parameter more closely matching corresponding values of the back electromotive force profile than corresponding values of the base driving profile, and wherein the motor driving profile is designated for the operating brushless direct current motor;

storing the scaling factor;

providing the scaling factor to the first driving profile controller of the brushless direct current motor;

transmitting, via a first transceiver of the first driving profile controller, the scaling factor and the back electromotive force profile to the second driving profile controller;

generating the base driving profile at the second driving profile controller;

transmitting the base driving profile or the motor driving profile from the second driving profile controller to the first driving profile controller via a second transceiver;

based on the scaling factor, converting the base driving profile to the motor driving profile to match the back electromotive force profile; and driving a drive circuit of the operating brushless direct current motor according to the motor driving profile.

18. The method of claim 17, further comprising selecting one or more conversion constants based on (i) the base driving profile, (ii) the scaling factor, and (iii) the back electromotive force profile, wherein selection of the one or more conversion constants includes adjusting the one or more conversion constants, via a curve fitting process, such that a curve of the motor driving profile more closely matches a curve of the back electromotive force profile than a curve of the base driving profile.

19. The method of claim 17, further comprising determining a second scaling factor, indicative of how much to increase an operating parameter of the base driving profile, for a second brushless direct current motor.

20. The method of claim 17, wherein:
the motor driving profile is provided based on sums of (i) the values of the operating parameter of the base driving profile, and (ii) products of the scaling factor and determined quantities; and
the determined quantities are based on (i) the values of the operating parameter of the base driving profile, and (ii) a plurality of conversion constants.

21. The system of claim 1, wherein the second driving profile controller is configured to (i) based on the scaling factor, convert the base driving profile to the motor driving profile to match the back electromotive force profile, and (ii) transmit the motor driving profile to the first driving profile controller via the second transceiver.

22. The system of claim 21, wherein the motor controller is configured to (i) determine the scaling factor and conversion constants, and (ii) adjust the scaling factor and the conversion constants to best fit the motor driving profile to the back electromotive force profile.

23. The system of claim 1, wherein:
the second driving profile controller is configured to transmit the base driving profile to the first driving profile controller via the second transceiver; and
the first driving profile controller is configured to, based on the scaling factor, convert the base driving profile to the motor driving profile to match the back electromotive force profile.

24. The system of claim 23, wherein the test computer further includes a scaling factor controller configured to (i) determine the scaling factor and conversion constants, and (ii) adjust the scaling factor and the conversion constants to best fit the motor driving profile to the back electromotive force profile.

25. The system of claim 1, wherein:
the test computer comprises a scaling factor controller configured to (i) determine the scaling factor and conversion constants, and (ii) adjust the scaling factor and the conversion constants to best fit the motor driving profile to the back electromotive force profile;
the first driving profile controller is configured to generate the base driving profile based on at least one of the back electromotive force profile or the signals received from the sensors; and
the first transceiver is configured to transmit the scaling factor, the conversion constants and the base driving profile to the second driving profile controller.

* * * * *